(12) United States Patent
Oie (10) Patent No.: US 12,438,174 B2
(45) Date of Patent: Oct. 7, 2025

(54) ELECTROLYTE SHEET FOR SOLID OXIDE FUEL BATTERY, PRODUCTION METHOD OF ELECTROLYTE SHEET FOR SOLID OXIDE FUEL BATTERY, AND SINGLE CELL FOR SOLID OXIDE FUEL BATTERY

(71) Applicant: Murata Manufacturing Co., Ltd., Nagaokakyo (JP)

(72) Inventor: Hirofumi Oie, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 758 days.

(21) Appl. No.: 17/584,558

(22) Filed: Jan. 26, 2022

(65) Prior Publication Data

US 2022/0149412 A1  May 12, 2022

Related U.S. Application Data

(63) Continuation of application No. PCT/JP2020/029972, filed on Aug. 5, 2020.

(30) Foreign Application Priority Data

Aug. 6, 2019  (JP) ................. 2019-144728

(51) Int. Cl.
*H01M 8/1253* (2016.01)
*C04B 35/486* (2006.01)
(Continued)

(52) U.S. Cl.
CPC ......... *H01M 8/1253* (2013.01); *C04B 35/486* (2013.01); *C04B 2235/3246* (2013.01);
(Continued)

(58) Field of Classification Search
CPC ...... H01M 8/12; H01M 8/124; H01M 8/1253; H01M 2008/1293; H01M 2300/0077
See application file for complete search history.

(56) References Cited

U.S. PATENT DOCUMENTS 5,419,827 A * 5/1995 Nanataki ............... C04B 35/486
204/426
2005/0089739 A1* 4/2005 Seccombe, Jr. ...... H01M 4/8885
264/618
(Continued)

FOREIGN PATENT DOCUMENTS

JP  H0773891 A  3/1995
JP  2001247373 A  9/2001
(Continued)

OTHER PUBLICATIONS

International Search Report issued for PCT/JP2020/029972, date of mailing Oct. 27, 2020.

*Primary Examiner* — Jeremiah R Smith
(74) *Attorney, Agent, or Firm* — ArentFox Schiff LLP (57) ABSTRACT

An electrolyte sheet for solid oxide fuel cells includes a ceramic plate body containing a cubic zirconia sintered material, wherein, with the ceramic plate body being defined to have nine portions including an outer peripheral portion and a central portion, ceramic grains in each of the nine portions have a median size $D_{50}$ of 1.0 µm to 4.0 µm, and a maximum median size $D_{50}$ of the ceramic grains among the nine portions is 1.0 to 1.3 times a minimum median size $D_{50}$ of the ceramic grains among the nine portions.

5 Claims, 5 Drawing Sheets (51) Int. Cl.
  *H01M 8/12*       (2016.01)
  *H01M 8/124*      (2016.01)
(52) U.S. Cl.
  CPC .... *H01M 8/124* (2013.01); *H01M 2008/1293* (2013.01); *H01M 2300/0077* (2013.01)

(56) References Cited

U.S. PATENT DOCUMENTS

| | | | |
|---|---|---|---|
| 2007/0026289 A1* | 2/2007 | Horiuchi | H01M 8/1213 |
| | | | 429/495 |
| 2009/0047562 A1* | 2/2009 | Hata | C04B 35/6346 |
| | | | 264/332 |
| 2010/0159355 A1* | 6/2010 | Hata | C04B 35/62675 |
| | | | 429/495 |
| 2018/0339945 A1 | 11/2018 | Baba | |
| 2019/0088969 A1* | 3/2019 | Koizumi | H01M 8/1253 |

FOREIGN PATENT DOCUMENTS

| | | |
|---|---|---|
| JP | 2003022821 A | 1/2003 |
| JP | 2007510255 A | 4/2007 |
| JP | 2014191943 A | 10/2014 |
| JP | 2018199598 A | 12/2018 |

* cited by examiner

ELECTROLYTE SHEET FOR SOLID OXIDE FUEL BATTERY, PRODUCTION METHOD OF ELECTROLYTE SHEET FOR SOLID OXIDE FUEL BATTERY, AND SINGLE CELL FOR SOLID OXIDE FUEL BATTERY

CROSS REFERENCE TO RELATED APPLICATIONS

The present application is a continuation of International application No. PCT/JP2020/029972, filed Aug. 5, 2020, which claims priority to Japanese Patent Application No. 2019-144728, filed Aug. 6, 2019, the entire contents of each of which are incorporated herein by reference.

FIELD OF THE INVENTION

The present invention relates to an electrolyte sheet for solid oxide fuel cells, a method of producing an electrolyte sheet for solid oxide fuel cells, and a unit cell for solid oxide fuel cells.

BACKGROUND OF THE INVENTION

A solid oxide fuel cell (SOFC) is a device that produces electric energy through reactions of $H_2 + O^{2-} \rightarrow H_2O + 2e^-$ at the fuel electrode and $(1/2)O_2 + 2e^- \rightarrow O^{2-}$ at the air electrode. A solid oxide fuel cell is a stack of unit cells each including an electrolyte sheet made of a ceramic plate body and a fuel electrode and an air electrode that are formed on the electrolyte sheet.

For example, Patent Literature 1 discloses a method of producing a ceramic plate body by stacking a resin sheet or a resin layer on a surface of an unsintered plate body using a resin slurry containing a spherical resin powder, and compression-bonding the stack to form recesses on the surface of the unsintered plate body.

Patent Literature 1: JP 2018-199598 A

SUMMARY OF THE INVENTION

An example of an electrolyte sheet for solid oxide fuel cells is a ceramic plate body containing a zirconia sintered material. Such zirconia is known to have a crystal structure such as a tetragonal or cubic crystal structure. Tetragonal zirconia is partially stabilized zirconia and known as a ceramic material that exhibits high strength through tetragonal to rhombohedral phase transition when sintered. Meanwhile, cubic zirconia is known as a ceramic material that has a high ion conductivity when sintered.

Cubic zirconia starts to sinter at a lower temperature than tetragonal zirconia and grains of cubic zirconia grow faster than those of tetragonal zirconia. Densifying cubic zirconia in sintering is difficult because pore (void) elimination occurs rather slowly and pores tend to remain between and within the grains. Thus, densification of a cubic zirconia sintered material is the key to increase the strength of an electrolyte sheet for solid oxide fuel cells made of a ceramic plate body containing a cubic zirconia sintered material.

Meanwhile, electrolyte sheets for solid oxide fuel cells are expected to have an increased size and a reduced thickness for an increase in the power generation efficiency of solid oxide fuel cells. However, reduction in thickness of an electrolyte sheet for solid oxide fuel cells tends to involve a decrease in strength as well as defects such as warpage and burrs. In this respect as well, densification of electrolyte sheets for solid oxide fuel cells is the key.

Patent Literature 1 discloses compression-bonding a stack of an unsintered plate body and a resin sheet or a resin layer on a surface of the unsintered plate body. This method burns off the resin sheet or the resin layer at relatively low temperatures (for example, 200° C. to 500° C.). There is therefore no factor to inhibit the shrinkage of an unsintered plate body at the temperature at which the unsintered plate body starts to shrink (for example, 800° C. or higher). This seems to suggest that the resulting electrolyte sheet for solid oxide fuel cells is likely to be dense. The present inventor examined this method and found that the resin sheet or the resin layer actually starts to be burned off from its portion on an outer peripheral area, so that the burn-off time of the resin sheet or resin layer is different between its portion on the outer peripheral area and its portion on the central area. Such a variation in burn-off time of the resin sheet or the resin layer is an issue to be worked out because the variation adversely affects densification of an electrolyte sheet for solid oxide fuel cells.

The present invention was made to solve the above problem, and aims to provide an electrolyte sheet for solid oxide fuel cells which has high strength and less or no warpage and less or no burrs. The present invention also aims to provide a method of producing the electrolyte sheet for solid oxide fuel cells. Furthermore, the present invention aims to provide a unit cell for solid oxide fuel cells which includes the electrolyte sheet for solid oxide fuel cells.

In a first embodiment, an electrolyte sheet for solid oxide fuel cells of the present invention includes a ceramic plate body containing a cubic zirconia sintered material, wherein, with the ceramic plate body being defined to have nine portions including an outer peripheral portion and a central portion, ceramic grains in each of the nine portions have a median size $D_{50}$ of 1.0 μm to 4.0 μm, and a maximum median size $D_{50}$ of the ceramic grains among the nine portions is 1.0 to 1.3 times a minimum median size $D_{50}$ of the ceramic grains among the nine portions.

In a second embodiment, the electrolyte sheet for solid oxide fuel cells of the present invention includes a ceramic plate body containing a cubic zirconia sintered material, wherein, with the ceramic plate body being defined to have nine portions including an outer peripheral portion and a central portion, a maximum density of the ceramic plate body among the nine portions is 1.0 to 1.3 times a minimum density of the ceramic plate body among the nine portions.

A method of producing an electrolyte sheet for solid oxide fuel cells of the present invention includes: forming a resin layer containing a resin powder on both a central area and an outer peripheral area surrounding the central area of at least one main surface of an unsintered plate body containing a cubic zirconia powder-containing ceramic material powder such that a thickness of the resin layer on the outer peripheral area is double to quadruple a thickness of the resin layer on the central area, and such that in a plan view from a thickness direction of the unsintered plate body, a width of the outer peripheral area of the unsintered plate body is 10% to 40% of a shortest distance between an outer edge and a center of the unsintered plate body; producing an unsintered body by pressing together the unsintered plate body and the resin layer on the at least one main surface of the unsintered plate body; and firing the unsintered body to burn off the resin layer and sinter the unsintered plate body into a ceramic plate body.

A unit cell for solid oxide fuel cells of the present invention includes: a fuel electrode; an air electrode; and the electrolyte sheet for solid oxide fuel cells of the present invention between the fuel electrode and the air electrode.

The present invention can provide an electrolyte sheet for solid oxide fuel cells which has high strength and less or no warpage and less or no burrs. The present invention can also provide a method of producing the electrolyte sheet for solid oxide fuel cells. Furthermore, the present invention can provide a unit cell for solid oxide fuel cells which includes the electrolyte sheet for solid oxide fuel cells.

DETAILED DESCRIPTION OF THE PREFERRED EMBODIMENTS

The electrolyte sheet for solid oxide fuel cells (hereinafter, also referred to as the electrolyte sheet) of the present invention, the method of producing an electrolyte sheet for solid oxide fuel cells (hereinafter, also referred to as the method of producing an electrolyte sheet) of the present invention, and the unit cell for solid oxide fuel cells (hereinafter, also referred to as the unit cell) of the present invention are described below. The present invention is not limited to the following preferred embodiments, and may be suitably modified without departing from the gist of the present invention. Combinations of two or more preferred features described in the following preferred features are also within the scope of the present invention.

The drawings are schematic drawings, and the dimensions, the aspect ratio, the scale, and other parameters may differ from those of the actual products.

Electrolyte Sheet for Solid Oxide Fuel Cells

Figure 1:
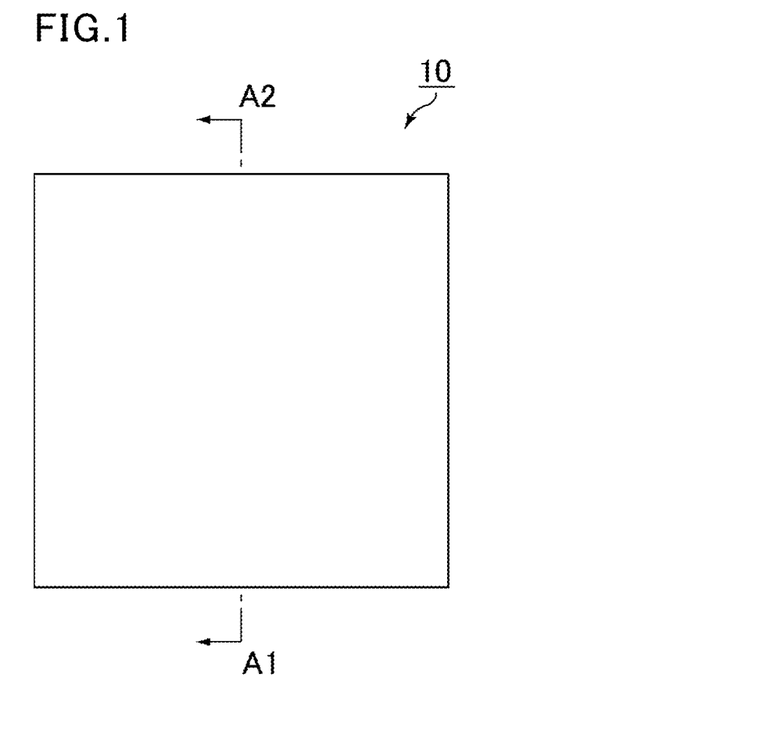
FIG. 1 is a schematic plan view of an example of an electrolyte sheet for solid oxide fuel cells of the present invention.
Figure 2:
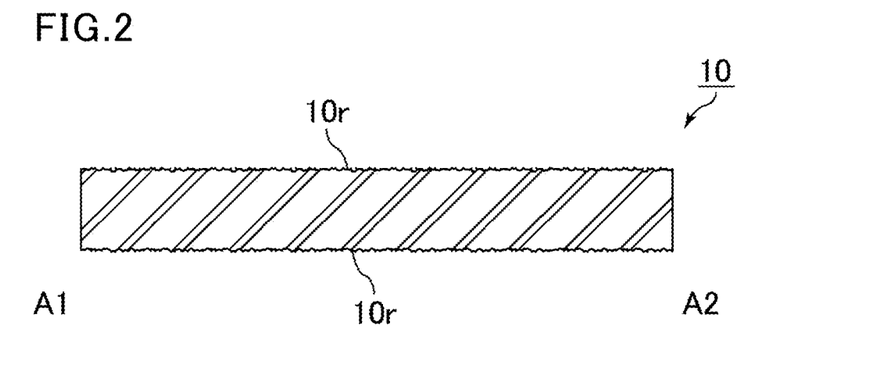
FIG. 2 is a schematic cross-sectional view of a portion taken along line A1-A2 in FIG. 1.

An example of the electrolyte sheet for solid oxide fuel cells of the present invention is described below. FIG. 1 is a schematic plan view of an example of an electrolyte sheet for solid oxide fuel cells of the present invention. FIG. 2 is a schematic cross-sectional view of a portion taken along line A1-A2 in FIG. 1.

An electrolyte sheet 10 for solid oxide fuel cells shown in FIG. 1 and FIG. 2 is made of a ceramic plate body.

A ceramic plate body contains a cubic zirconia sintered material. Thus, the electrolyte sheet 10 has a high ion conductivity.

Examples of cubic zirconia include those stabilized with an oxide of a rare-earth element such as scandium or yttrium. Specific examples include scandia-stabilized cubic zirconia and yttria-stabilized cubic zirconia. In particular, cubic zirconia is preferably scandia-stabilized cubic zirconia. The crystal structure of zirconia is determined by, for example, a crystallographic analysis such as X-ray diffraction (XRD).

As shown in FIG. 2, preferably, recesses 10r are scattered on a first main surface and a second main surface of the electrolyte sheet 10. With the recesses 10r scattered on the first main surface and the second main surface of the electrolyte sheet 10, the area of contact between the electrodes and gas is large in a solid oxide fuel cell with the electrolyte sheet 10. This ultimately increases the power generation efficiency of the solid oxide fuel cell. The recesses 10r may be scattered only on one of the first main surface and the second main surface of the electrolyte sheet 10.

In a plan view from a thickness direction of the electrolyte sheet 10 (vertical direction in FIG. 2), the electrolyte sheet 10 has a square shape as shown in FIG. 1.

In a plan view from the thickness direction, preferably, the electrolyte sheet 10 has a substantially rectangular shape with rounded corners, more preferably a substantially square shape with rounded corners, although not shown. In this case, all the corners may be rounded or some corners may be rounded.

Preferably, the electrolyte sheet 10 is provided with a through hole penetrating the electrolyte sheet 10 in the thickness direction, although not shown. Such a through hole functions as a gas flow path in a solid oxide fuel cell.

One through hole or two or more through holes may be provided.

In a plan view from the thickness direction, a through hole may have a circular shape or any other shape.

Such a through hole may be provided at any position.

The electrolyte sheet 10 has a thickness of preferably 200 μm or less, more preferably 130 μm or less. Also, the electrolyte sheet 10 has a thickness of preferably 30 μm or more, more preferably 50 μm or more.

The thickness of the electrolyte sheet 10 is determined as follows. First, the thickness is measured at randomly selected nine sites within a region excluding the portions 5 mm inside the peripheral edges of the sheet with a U-shape Frame Sheet Metal Micrometer (available from Mitutoyo Corporation, PMU-MX). The average of the thicknesses measured at the nine sites is calculated. The average is taken as the thickness of the electrolyte sheet 10.

In the first embodiment of the electrolyte sheet for solid oxide fuel cells of the present invention, with the ceramic plate body being defined to have nine portions including an outer peripheral portion and a central portion, ceramic grains in each of the nine portions have a median size $D_{50}$ of 1.0 μm to 4.0 μm, and a maximum median size $D_{50}$ of the ceramic grains among the nine portions is 1.0 to 1.3 times a minimum median size $D_{50}$ of the ceramic grains among the nine portions.

With a median size $D_{50}$ of the ceramic grains falling within the range above, the ceramic grains can have a uniform size in the electrolyte sheet 10 made of a ceramic plate body containing a cubic zirconia sintered material. As a result, the electrolyte sheet 10 is densified to exhibit high strength with less or no warpage and less or no burrs.

Figure 3:
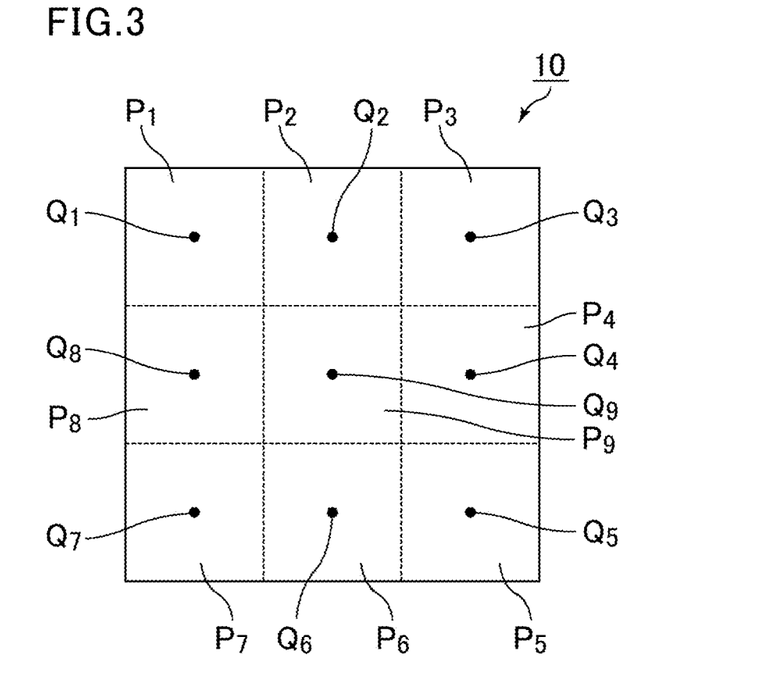
FIG. 3 is a schematic plan view of portions at which the median sizes $D_{50}$ of ceramic grains in an electrolyte sheet are measured.

The following descries an example of a method of measuring the median size $D_{50}$ of ceramic grains in the electrolyte sheet 10 as shown in FIG. 1 and FIG. 2. FIG. 3 is a schematic plan view of portions at which the median sizes $D_{50}$ of ceramic grains in an electrolyte sheet are measured.

First, as shown in FIG. 3, the electrolyte sheet 10 is split at equal intervals into nine pieces $P_1$ to $P_9$. At the center points $Q_1$ to $Q_9$ of the respective pieces (the positions indicated by the black dots in FIG. 3: the intersections of the diagonal lines in each of the pieces $P_1$ to $P_9$), an SEM image is taken at a magnification of 3000× with a tabletop microscope "TM3000" available from Hitachi High-Tech Corporation. The pieces $P_1$ to $P_8$ correspond to outer peripheral portions of the electrolyte sheet 10. The piece $P_9$ corresponds to the central portion of the electrolyte sheet 10. Each SEM image is subjected to image analysis with an image analysis measurement system "WinROOF2018 grain boundary extraction module" available from Mitani Corporation. From the measurement results of the sizes of 100 or more ceramic grains, the median size $D_{50}$ is calculated.

In the first embodiment of the electrolyte sheet for solid oxide fuel cells of the present invention, preferably, a maximum density of the ceramic plate body among the nine portions is 1.0 to 1.3 times a minimum density of the ceramic plate body among the nine portions.

In the second embodiment of the electrolyte sheet for solid oxide fuel cells of the present invention, with the ceramic plate body being defined to have nine portions including an outer peripheral portion and a central portion, a maximum density of the ceramic plate body among the nine portions is 1.0 to 1.3 times a minimum density of the ceramic plate body among the nine portions.

With a density of the ceramic plate body falling within the range above, the ceramic plate body can have a uniform density in the electrolyte sheet 10 made of the ceramic plate body containing a cubic zirconia sintered material. As a result, the electrolyte sheet 10 is densified to exhibit high strength with less or no warpage and less or no burrs.

The following describes an example of a method of measuring the density of a ceramic plate body in the electrolyte sheet 10 as shown in FIG. 1 and FIG. 2.

First, the area and weight of each of the nine pieces $P_1$ to $P_9$ of the electrolyte sheet 10 described with reference to FIG. 3 are measured. Then, the volume of each of the pieces $P_1$ to $P_9$ is determined from the thickness of the electrolyte sheet 10. The density is calculated by dividing the weight by the volume.

Method of Producing Electrolyte Sheet for Solid Oxide Fuel Cells

The electrolyte sheet for solid oxide fuel cells of the present invention is produced by the following method, for example.

Producing Ceramic Green Sheet

Figure 4:
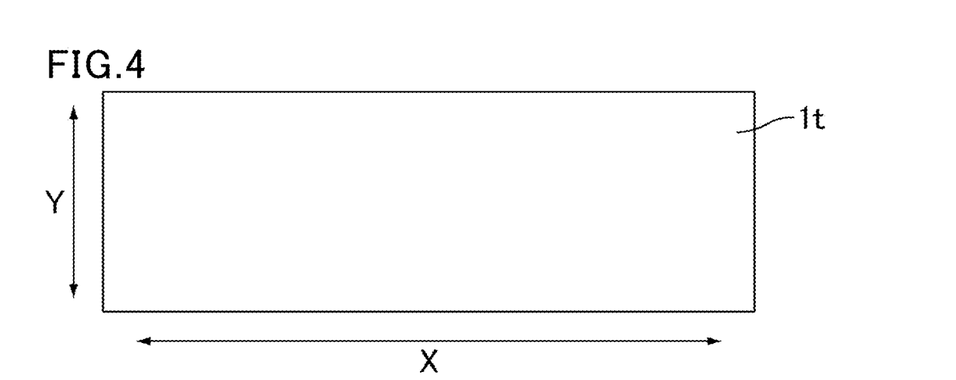
FIG. 4 is a schematic plan view of an example of producing ceramic green sheets.
Figure 5:
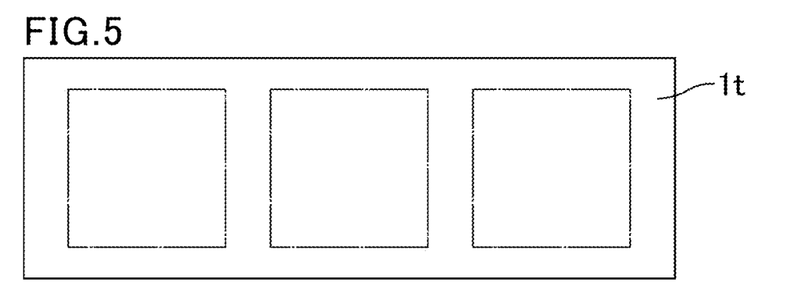
FIG. 5 is another schematic plan view of the example of producing ceramic green sheets.
Figure 6:
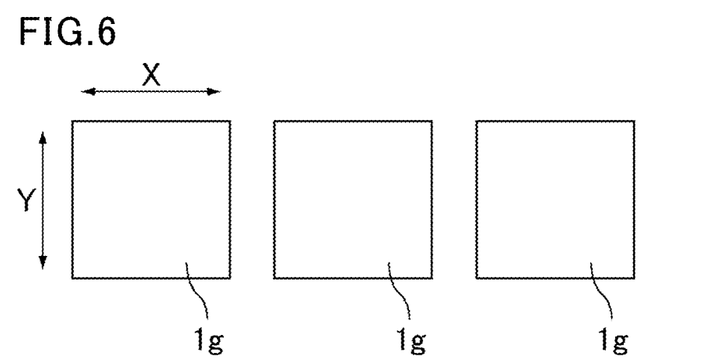
FIG. 6 is yet another schematic plan view of the example of producing ceramic green sheets.

FIG. 4 is a schematic plan view of an example of producing ceramic green sheets. FIG. 5 is another schematic plan view of the example of producing ceramic green sheets. FIG. 6 is yet another schematic plan view of the example of producing ceramic green sheets.

A ceramic material powder, a binder, a dispersant, an organic solvent, and the like are suitably mixed to prepare a ceramic slurry. A first main surface of a carrier film is coated with the obtained ceramic slurry to produce ceramic green tape 1t as shown in FIG. 4.

The ceramic green tape 1t is preferably produced by tape casting, particularly preferably doctor blading or calendaring. FIG. 4 shows the casting directions for the tape casting by X and the directions perpendicular to the casting directions by Y.

The ceramic material powder contains a cubic zirconia powder. Examples of the cubic zirconia powder include powder of cubic zirconia stabilized with an oxide of a rare-earth element such as scandium or yttrium. Specific examples include scandia-stabilized cubic zirconia powder and yttria-stabilized cubic zirconia powder. In particular, the cubic zirconia powder is preferably scandia-stabilized cubic zirconia powder.

The resulting ceramic green tape 1t is punched to obtain pieces having a predetermined size by a known technique as shown in FIG. 5. The pieces are removed from the carrier film and ceramic green sheets 1g are produced as shown in FIG. 6. Punching of the ceramic green tape 1t and removal of the punched-out pieces from the carrier film may be performed in any order.

Producing Unsintered Plate Body

Figure 7:
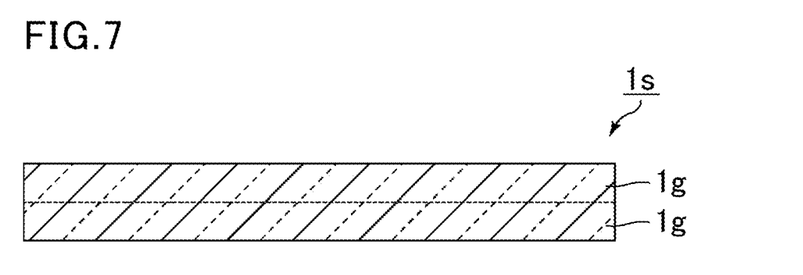
FIG. 7 is a schematic cross-sectional view of an example of producing an unsintered plate body.

FIG. 7 is a schematic cross-sectional view of an example of producing an unsintered plate body.

As shown in FIG. 7, an unsintered plate body 1s is produced by stacking two ceramic green sheets 1g and compression-bonding the stack. The unsintered plate body 1s contains a cubic zirconia powder-containing ceramic material powder.

The number of ceramic green sheets 1g used to produce the unsintered plate body 1s may be two as shown in FIG. 7, or may be three or more. The ceramic green sheets 1g may be compression-bonded, or may simply be stacked on one another without being compression-bonded. When the unsintered plate body 1s includes a plurality of ceramic green sheets 1g, the thickness of a ceramic plate body to be obtained can be controlled as appropriate in a simple manner.

The unsintered plate body 1s may be produced using one ceramic green sheet 1g. In this case, the step shown in FIG. 7 is omitted.

Forming Resin Layer

Figure 8:
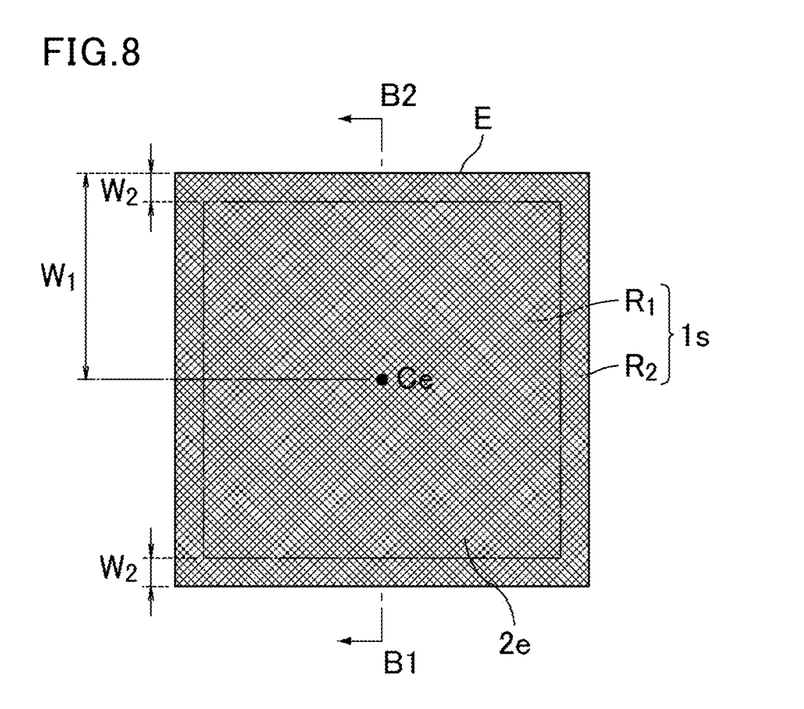
FIG. 8 is a schematic plan view of an example of forming a resin layer.
Figure 9:
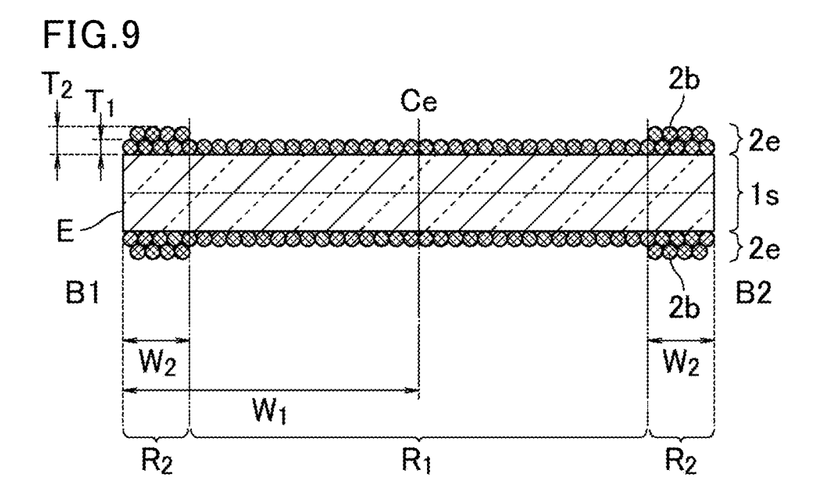
FIG. 9 is a schematic cross-sectional view of a portion taken along line B1-B2 in FIG. 8.

FIG. 8 is a schematic plan view of an example of forming a resin layer. FIG. 9 is a schematic cross-sectional view of a portion taken along line B1-B2 in FIG. 8.

The resin powder 2b, a binder, a dispersant, an organic solvent, and the like are suitably mixed to prepare a resin slurry.

The resin powder 2b is preferably made of a resin material that is poorly soluble in an organic solvent used in production of a resin slurry. The expression "poorly soluble in an organic solvent" herein means that when 0.1 g of a resin powder and 100 g of an organic solvent are mixed at room temperature (25° C.) for 24 hours, there remains a visually observable residue. The organic solvent used to prepare a resin slurry is, for example, at least one solvent (alone or in a mixture) selected from toluene, ethanol, isopropanol, butyl acetate, ethyl acetate, terpineol, and water. In this case, the resin powder 2b is made of a crosslinked acrylic resin, for example.

Preferably, the resin powder 2b has a spherical shape as shown in FIG. 9. When having a spherical shape, the resin powder 2b has a median size $D_{50}$ of 0.5 µm to 10 µm, for example.

When the resin powder 2b has a spherical shape, the median size $D_{50}$ of the resin powder 2b is defined as the particle size at 50% in a cumulative particle size distribution curve of the resin powder 2b expressed as cumulative percentage against particle size scale. The particle size distribution of the resin powder 2b is measured with, for example, a laser diffraction particle size distribution measuring device. The median size used here is the equivalent spherical diameter because the resin powder $2b$ may have a shape distorted through the production processes.

Then, as shown in FIG. 8 and FIG. 9, a first main surface (the top surface in FIG. 9) of the unsintered plate body $1s$ is coated with the obtained resin slurry to form a resin layer $2e$ on the first main surface of the unsintered plate body $1s$. As shown in FIG. 8 and FIG. 9, the resin layer $2e$ is formed on both a central area $R_1$ and an outer peripheral area $R_2$ surrounding the central area $R_1$ on the first main surface of the unsintered plate body $1s$, with the thickness of the resin layer $2e$ on the outer peripheral area $R_2$ being double to quadruple the thickness of the resin layer $2e$ on the central area $R_1$. In other words, as shown in FIG. 9, a thickness $T_2$ of the resin layer $2e$ on the outer peripheral area $R_2$ is double to quadruple a thickness $T_1$ of the resin layer $2e$ on the central area $R_1$. Preferably, the thickness $T_2$ of the resin layer $2e$ on the outer peripheral area $R_2$ is double to triple the thickness $T_1$ of the resin layer $2e$ on the central area $R_1$.

Both the central area $R_1$ and the outer peripheral area $R_2$ of the unsintered plate body $1s$ may be coated with the resin slurry to form the resin layer $2e$ having the thicknesses described above. For example, both the central area $R_1$ and the outer peripheral area $R_2$ of the unsintered plate body $1s$ may be coated with the resin slurry to the thickness $T_1$, and then the outer peripheral area $R_2$ of the unsintered plate body $1s$ may be coated with the resin slurry to a thickness that is one time to triple the thickness $T_1$. Such application of the resin slurry makes the thickness $T_2$ of the resulting resin layer $2e$ on the outer peripheral area $R_2$ double to quadruple the thickness $T_1$ of the resin layer $2e$ on the central area $R_1$.

The thickness $T_1$ of the resin layer $2e$ on the central area $R_1$ is determined as follows. First, the thickness is measured at randomly selected nine sites within a region excluding the portions 5 mm inside the peripheral edges of the unsintered plate body $1s$ with a U-shape Frame Sheet Metal Micrometer (available from Mitutoyo Corporation, PMU-MX). The resin layer $2e$ is formed on the first main surface of the unsintered plate body $1s$, and the thickness is measured at the nine sites again. The average of the differences of the thicknesses measured at the nine sites is calculated. The average is taken as the thickness $T_1$ of the resin layer $2e$ on the central area $R_1$.

The thickness $T_2$ of the resin layer $2e$ on the outer peripheral area $R_2$ is determined as follows. First, the thickness is measured at randomly selected nine sites within a region from the peripheral edges of the unsintered plate body $1s$ to the positions 5 mm inside the edges with a U-shape Frame Sheet Metal Micrometer (available from Mitutoyo Corporation, PMU-MX). The resin layer $2e$ is formed on the first main surface of the unsintered plate body $1s$, and the thickness is measured at the nine sites again. The average of the differences of the thicknesses measured at the nine sites is calculated. The average is taken as the thickness $T_2$ of the resin layer $2e$ on the outer peripheral area $R_2$.

In a plan view from a thickness direction of the unsintered plate body $1s$ (vertical direction in FIG. 9), as shown in FIG. 8, a width $W_2$ of the outer peripheral area $R_2$ of the unsintered plate body $1s$ is 10% to 40% of the shortest distance $W_1$ between the outer edge E and the center Ce of the unsintered plate body $1s$. The width $W_2$ of the outer peripheral area $R_2$ of the unsintered plate body $1s$ is preferably 20% to 40% of the shortest distance $W_1$ between the outer edge E and center Ce of the unsintered plate body $1s$.

The outer peripheral area $R_2$ of the unsintered plate body $1s$ may include the entire outer edge E of the unsintered plate body $1s$ as shown in FIG. 8, i.e., the outer peripheral area $R_2$ may entirely surround the central area $R_1$. Also, the outer peripheral area $R_2$ of the unsintered plate body $1s$ may include part of the outer edge E of the unsintered plate body $1s$, i.e., the outer peripheral area $R_2$ may partly surround the central area $R_1$.

The width $W_2$ of the outer peripheral area $R_2$ of the unsintered plate body $1s$ may be constant within the outer peripheral area $R_2$ as shown in FIG. 8 or may not be constant within the outer peripheral area $R_2$, as long as the width $W_2$ is 10% to 40% of the shortest distance $W_1$ between the outer edge E and center Ce of the unsintered plate body $1s$.

When the resin layer $2e$ is formed, a resin sheet may be disposed instead of application of a resin slurry. A resin sheet is obtained by coating a first main surface of a carrier film with a resin slurry prepared by suitably mixing the resin powder $2b$, a binder, a dispersant, an organic solvent, and the like. The resin sheet may have any thickness as long as the thickness of the resin sheet on the outer peripheral area $R_2$ is double to quadruple the thickness of the resin sheet on the central area $R_1$ on the first main surface of the unsintered plate body $1s$.

Preferably, the resin layer $2e$ has a thickness of 3 μm to 40 μm. With the thickness of the resin layer $2e$ falling within the range above, the thermal energy used to burn off the resin layer $2e$ in the later-described producing a ceramic plate body is small, so that the firing time can be shortened.

In the forming a resin layer, additionally, as shown in FIG. 9, a second main surface (the bottom surface in FIG. 9) of the unsintered plate body $1s$ may be coated with the resin slurry to form a resin layer $2e$ on the second main surface of the unsintered plate body $1s$. Here, preferably, as with the first main surface of the unsintered plate body $1s$, the resin layer $2e$ is formed on both the central area $R_1$ and the outer peripheral area $R_2$ on the second main surface of the unsintered plate body $1s$, with the thickness of the resin layer $2e$ on the outer peripheral area $R_2$ being double to quadruple the thickness of the resin layer $2e$ on the central area $R_1$, more preferably with the thickness of the resin layer $2e$ on the outer peripheral area $R_2$ being double to triple the thickness of the resin layer $2e$ on the central area $R_1$.

Producing Unsintered Body

Figure 10:
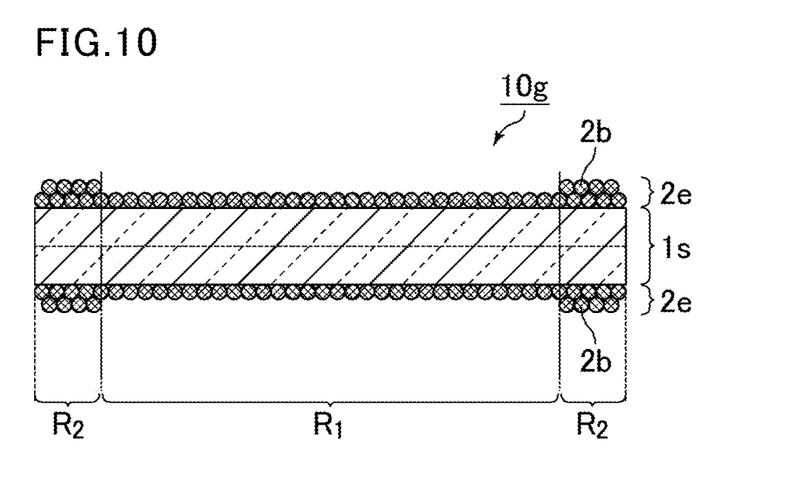
FIG. 10 is a schematic cross-sectional view of an example of producing an unsintered body.

FIG. 10 is a schematic cross-sectional view of an example of producing an unsintered body.

As shown in FIG. 10, an unsintered body $10g$ is produced by pressing together the unsintered plate body $1s$ and the resin layers $2e$ on the first main surface and the second main surface of the unsintered plate body $1s$.

When the unsintered plate body $1s$ and the resin layers $2e$ on the first main surface and the second main surface of the unsintered plate body $1s$ are pressed together, the resin layers $2e$ are pressed onto the first main surface and the second main surface of the unsintered plate body $1s$. This forms scattered recesses having a shape derived from the shape of the resin powder $2b$ on the first main surface and the second main surface of the unsintered plate body $1s$.

Unlike the forming the resin layer $2e$ described above, in the unsintered body $10g$, the thickness of the resin layer $2e$ on the outer peripheral area $R_2$ of the unsintered plate body $1s$ is not necessarily double to quadruple the thickness of the resin layer $2e$ on the central area $R_1$ of the unsintered plate body $1s$. Yet, preferably, the thickness of the resin layer $2e$ on the outer peripheral area $R_2$ of the unsintered plate body $1s$ is double to quadruple the thickness of the resin layer $2e$ on the central area $R_1$ of the unsintered plate body $1s$.

Forming Through Hole in Unsintered Body

Although not shown, the unsintered body 10g may be provided with a through hole that penetrates the unsintered body 10g in the stacking direction of the ceramic green sheets.

The through hole is preferably formed by drilling. In this case, the unsintered body 10g is drilled from its first main surface to second main surface or vice versa such that the through hole penetrating the unsintered body 10g in the stacking direction is formed. The drilling may be performed under any conditions.

The through hole may penetrate the central area $R_1$ of the unsintered plate body 1s, may penetrate the outer peripheral area $R_2$ of the unsintered plate body 1s, or may penetrate both the central area $R_1$ and the outer peripheral area $R_2$ of the unsintered plate body 1s.

One through hole may be formed or two or more through homes may be formed.

No through hole may be formed. In this case, the forming a through hole is omitted.

Producing Ceramic Plate Body

Figure 11:
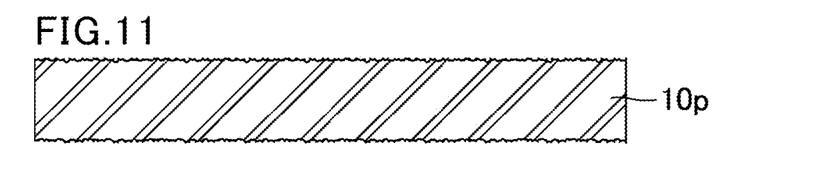
FIG. 11 is a schematic cross-sectional view of an example of producing a ceramic plate body.

FIG. 11 is a schematic cross-sectional view of an example of producing a ceramic plate body.

As shown in FIG. 11, a ceramic plate body 10p is produced by burning off the resin layers 2e and sintering the unsintered plate body 1s through firing the unsintered body 10g. When the unsintered body 10g is provided with a through hole, the ceramic plate body 10p is provided with a through hole penetrating therethrough in a thickness direction thereof.

In firing the unsintered body 10g, the resin layers 2e start to be burned off from its portion on the outer peripheral area $R_2$ of the unsintered plate body 1s. Here, in forming each resin layer 2e, when the thickness of the resin layer 2e on the outer peripheral area $R_2$ of the unsintered plate body 1s is controlled to be double to quadruple the thickness of the resin layer 2e on the central area $R_1$ as described above, the thickness of the resin layer 2e on the outer peripheral area $R_2$ of the unsintered plate body 1s in the resulting unsintered body 10g is adequately larger than the thickness of the resin layer 2e on the central area $R_1$ of the unsintered plate body 1s. In this case, the portion of the resin layer 2e on the outer peripheral area $R_2$, having a larger thickness, takes longer burn-off time, so that the difference in burn-off time between the portion of the resin layer 2e on the outer peripheral area $R_2$ and the portion of the resin layer 2e on the central area $R_1$ is reduced. This makes the burn-off time uniform on the central area $R_1$ and the outer peripheral area $R_2$ as compared to the case where the resin layer 2e has a uniform thickness on the central area $R_1$ and the outer peripheral area $R_2$. The resulting ceramic plate body 10p is thus made dense, meaning specifically that the size of the ceramic grains (for example, median size $D_{50}$) is made uniform. Also, the amount of pores generated in sintering of the unsintered plate body 1s is made uniform, whereby the density of the ceramic plate body 10p is made uniform.

In forming each resin layer 2e, when the thickness of the resin layer 2e on the outer peripheral area $R_2$ of the unsintered plate body 1s is smaller than the thickness double the thickness of the resin layer 2e on the central area $R_1$ or larger than the thickness quadruple the thickness of the resin layer 2e on the central area $R_1$, firing the unsintered body 10g results in non-uniform burn-off time of the resin layer 2e on the central area $R_1$ and the outer peripheral area $R_2$. Also when the width $W_2$ of the outer peripheral area $R_2$ of the unsintered plate body 1s is less than 10% or more than 40% of the shortest distance $W_1$ between the outer edge E and the center Ce of the unsintered plate body 1s, firing the unsintered body 10g results in non-uniform burn-off time of the resin layer 2e between the central area $R_1$ and the outer peripheral area $R_2$.

Preferably, the firing the unsintered body 10g includes degreasing and sintering.

Thus, the ceramic plate body 10p with scattered recesses on its first main surface and second main surface is produced. The method of producing an electrolyte sheet described above can densify the ceramic plate body 10p. Specifically, in the ceramic plate body 10p, the ceramic grains have a median size $D_{50}$ as measured by the method above of 1.0 μm to 4.0 μm and the maximum median size $D_{50}$ of the ceramic grains is 1.0 to 1.3 times the minimum median size $D_{50}$ of the ceramic grains. Also, the maximum density of the ceramic plate body 10p as measured by the method above is 1.0 to 1.3 times the minimum density of the ceramic plate body 10p. In other words, the method of producing an electrolyte sheet described above can provide the electrolyte sheet for solid oxide fuel cells of the present invention including the ceramic plate body 10p (for example, the electrolyte sheet 10 in FIG. 1 and FIG. 2).

Unit Cell for Solid Oxide Fuel Cells

Figure 12:
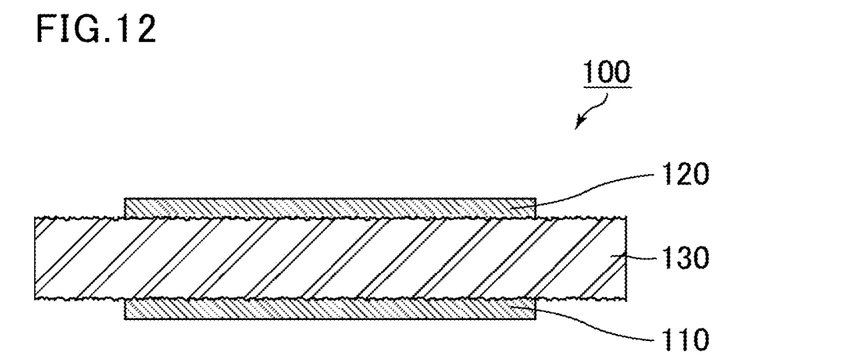
FIG. 12 is a schematic cross-sectional view of an example of a unit cell for solid oxide fuel cells of the present invention.

The following describes an example of the unit cell for solid oxide fuel cells of the present invention. FIG. 12 is a schematic cross-sectional view of an example of a unit cell for solid oxide fuel cells of the present invention.

As shown in FIG. 12, a unit cell 100 for solid oxide fuel cells includes a fuel electrode 110, an air electrode 120, and an electrolyte sheet 130. The electrolyte sheet 130 is disposed between the fuel electrode 110 and the air electrode 120.

The fuel electrode 110 may be a known fuel electrode for solid oxide fuel cells.

The air electrode 120 may be a known air electrode for solid oxide fuel cells.

The electrolyte sheet 130 is the electrolyte sheet for solid oxide fuel cells of the present invention (for example, the electrolyte sheet 10 in FIG. 1 and FIG. 2).

Method of Producing Unit Cell for Solid Oxide Fuel Cells

The unit cell for solid oxide fuel cells of the present invention is produced by the following method, for example.

First, a slurry for a fuel electrode and a slurry for an air electrode are prepared. The slurry for a fuel electrode is prepared by mixing a powder of a material of a fuel electrode with a binder, a dispersant, a solvent, and the like as appropriate. The slurry for an air electrode is prepared by mixing a powder of a material of an air electrode with a binder, a dispersant, a solvent, and the like as appropriate.

The material of a fuel electrode may be a known material of a fuel electrode for solid oxide fuel cells.

The material of an air electrode may be a known material of an air electrode for solid oxide fuel cells.

The binder, dispersant, solvent, and other additives in a slurry for a fuel electrode may be those known in a method of forming a fuel electrode for solid oxide fuel cells. The binder, dispersant, solvent, and other additives in a slurry for an air electrode may be those known in a method of forming an air electrode for solid oxide fuel cells.

Then, a first main surface of the electrolyte sheet is coated with the slurry for a fuel electrode to a predetermined thickness and a second main surface of the electrolyte sheet is coated with the slurry for an air electrode to a predetermined thickness. These coating films are dried to form a green layer for a fuel electrode and a green layer for an air electrode.

The green layer for a fuel electrode and the green layer for an air electrode are then fired to form a fuel electrode and an air electrode. The firing conditions such as the firing temperature may be determined as appropriate depending on the material and the like of the fuel electrode or the air electrode.

EXAMPLES

Examples that more specifically disclose the electrolyte sheet for solid oxide fuel cells of the present invention are described below. The present invention is not limited to these examples.

Example 1

An electrolyte sheet of Example 1 was produced by the following method.
Producing Ceramic Green Sheet
Scandia-stabilized cubic zirconia powder, a binder, a dispersant, and an organic solvent were compounded at a predetermined ratio. The organic solvent used was a 7:3 mixture by weight of toluene and ethanol. The compounded product was stirred with a medium made of partially stabilized zirconia at 1000 rpm for three hours to form a ceramic slurry.

The ceramic slurry was formed into a sheet on a first main surface of a carrier film made of polyethylene terephthalate by a known technique of tape casting to give a ceramic green tape.

The ceramic green tape was punched by a known technique into pieces having a predetermined size and removed from the carrier film. Thus, ceramic green sheets were produced.
Producing Unsintered Plate Body
An unsintered plate body was produced by stacking two ceramic green sheets and compression-bonding the stack.
Forming Resin Layer
A resin powder, a binder, a dispersant, and an organic solvent were compounded at a predetermined ratio. The resin powder used was a spherical resin powder made of a crosslinked acrylic resin. The organic solvent used was a 7:3 mixture by weight of toluene and ethanol. The compounded product was stirred with a medium made of partially stabilized zirconia at 1000 rpm for three hours to form a ceramic slurry.

The resin slurry was applied by printing to the central area and the outer peripheral area surrounding the central area on each of the first main surface and the second main surface of an unsintered plate body as shown in FIG. 8 and FIG. 9 to a thickness of 10 μm. The resin slurry was then further applied only to the outer peripheral area of the unsintered plate body to a thickness of 20 μm. In a plan view from a thickness direction of the unsintered plate body, the width of the outer peripheral area of the unsintered plate body was set to 40% of the shortest distance between the outer edge and center of the unsintered plate body. The printed resin slurry was dried to form resin layers on the first main surface and the second main surface of the unsintered plate body. The thickness of the resin layer was 10 μm on the central area and was 30 μm on the outer peripheral area on each of the first main surface and the second main surface of the unsintered plate body.
Producing Unsintered Body
The unsintered plate body and the resin layers on the first main surface and the second main surface of the unsintered plate body were pressed together to produce an unsintered body. The pressing was performed at a heating temperature of 60° C. and a pressing force of 1500 kgf/cm².
Producing Ceramic Plate Body
The unsintered body was fired in a furnace as follows. The unsintered body was degreased by holding the unsintered body at 400° C. for a predetermined time. The degreased unsintered body was sintered by holding the unsintered body at 1400° C. for five hours. Firing the unsintered body as described above burned off the resin layers and sintered the unsintered plate body to produce a ceramic plate body. The resulting ceramic plate body had a thickness of 100 μm.

Thus, an electrolyte sheet (ceramic plate body) of Example 1 was produced.

Example 2

An electrolyte sheet of Example 2 was produced by the same procedure as with the electrolyte sheet of Example 1, except that the conditions were changed to the following conditions.

The width of the outer peripheral area of the unsintered plate body: 10% of the shortest distance between the outer edge and the center of the unsintered plate body.

The thickness of the resin layer on the outer peripheral area in the forming a resin layer: 40 μm The temperature in sintering the unsintered body in the producing a ceramic plate body: 1200° C.

Example 3

An electrolyte sheet of Example 3 was produced by the same procedure as with the electrolyte sheet of Example 1, except that the conditions were changed to the following conditions.

The width of the outer peripheral area of the unsintered plate body: 20% of the shortest distance between the outer edge and the center of the unsintered plate body.

The temperature in sintering the unsintered body in the producing a ceramic plate body: 1600° C.

Example 4

An electrolyte sheet of Example 4 was produced by the same procedure as with the electrolyte sheet of Example 1, except that the conditions were changed to the following conditions.

The width of the outer peripheral area of the unsintered plate body: 30% of the shortest distance between the outer edge and the center of the unsintered plate body.

Example 5

An electrolyte sheet of Example 5 was produced by the same procedure as with the electrolyte sheet of Example 1, except that the conditions were changed to the following conditions.

The width of the outer peripheral area of the unsintered plate body: 20% of the shortest distance between the outer edge and the center of the unsintered plate body.

The thickness of the resin layer on the outer peripheral area in the forming a resin layer: 20 μm Comparative Example 1

An electrolyte sheet of Comparative Example 1 was produced by the same procedure as with the electrolyte sheet of Example 1, except that the conditions were changed to the following conditions.

The width of the outer peripheral area of the unsintered plate body: 20% of the shortest distance between the outer edge and the center of the unsintered plate body.

The thickness of the resin layer on the outer peripheral area in the forming a resin layer: 15 μm The temperature in sintering the unsintered body in the producing a ceramic plate body: 1200° C.

Comparative Example 2

An electrolyte sheet of Comparative Example 2 was produced by the same procedure as with the electrolyte sheet of Example 1, except that the conditions were changed to the following conditions.

The width of the outer peripheral area of the unsintered plate body: 20% of the shortest distance between the outer edge and the center of the unsintered plate body.

The thickness of the resin layer on the outer peripheral area in the forming a resin layer: 50 μm The temperature in sintering the unsintered body in the producing a ceramic plate body: 1600° C.

Comparative Example 3

An electrolyte sheet of Comparative Example 3 was produced by the same procedure as with the electrolyte sheet of Example 1, except that the conditions were changed to the following conditions.

The width of the outer peripheral area of the unsintered plate body: 50% of the shortest distance between the outer edge and the center of the unsintered plate body.

The thickness of the resin layer on the outer peripheral area in the forming a resin layer: 50 μm The temperature in sintering the unsintered body in the producing a ceramic plate body: 1600° C.

Comparative Example 4

An electrolyte sheet of Comparative Example 4 was produced by the same procedure as with the electrolyte sheet of Example 1, except that the conditions were changed to the following conditions.

The width of the outer peripheral area of the unsintered plate body: 5% of the shortest distance between the outer edge and the center of the unsintered plate body.

Comparative Example 5

An electrolyte sheet of Comparative Example 5 was produced by the same procedure as with the electrolyte sheet of Example 1, except that the conditions were changed to the following conditions.

The width of the outer peripheral area of the unsintered plate body: 0% of the shortest distance between the outer edge and the center of the unsintered plate body (no outer peripheral area)

Evaluation

The electrolyte sheets of Examples 1 to 5 and Comparative Examples 1 to 5 were subjected to the following evaluations.

The maximum and minimum median sizes $D_{50}$ of the ceramic grains in each of the electrolyte sheets of Examples 1 to 5 and Comparative Examples 1 to 5 were determined by the method described above. The ratio between these values (maximum median size/minimum median size) was calculated. Tables 1 and 2 show the results.

The maximum and minimum densities of the ceramic plate body in each of the electrolyte sheets of Examples 1 to 5 and Comparative Examples 1 to 5 were determined by the method described above. The ratio between these values (maximum density/minimum density) was calculated. Tables 1 and 2 show the results. Tables 1 and 2 show only the ratio of the maximum density to the minimum density (maximum density/minimum density) for each ceramic plate body.

The warpage heights of the electrolyte sheets of Examples 1 to 5 and Comparative Examples 1 to 5 were measured. Specifically, first, the height of each electrolyte sheet was measured at 16 points with a video measuring system (available from Nikon Corporation, NEXIV VMZ-R6555) and a virtual plane of the sheet was created. The height of the outer edge of the electrolyte sheet from the virtual plane was calculated as the warpage height. Tables 1 and 2 show the results. The evaluation criteria were as follows.

Acceptable: the warpage height was 300 μm or less.

Unacceptable: the warpage height was more than 300 μm.

The burr heights of the electrolyte sheets of Examples 1 to 5 and Comparative Examples 1 to 5 were measured. Specifically, first, each electrolyte sheet was scanned from the outer edge to a point 4 mm inside the outer edge at a speed of 0.5 mm/sec with a contact measuring device "SJ-400" available from Mitutoyo Corporation (stylus: 60° tip angle) and a virtual plane of the sheet was created. The height of a portion of the electrolyte sheet from the peripheral edge to a point 3 mm inside the edge was measured from the virtual plane. The obtained value was taken as the burr height. Tables 1 and 2 show the results. The evaluation criteria were as follows.

Acceptable: the burr height was 30 μm or less.

Unacceptable: the burr height was more than 30 μm.

The electrolyte sheets of Examples 1 to 5 and Comparative Examples 1 to 5 were subjected to a four-point bending test using a precision universal tester "AGS-X" available from Shimadzu Corporation to determine the strength. Specifically, each electrolyte sheet was placed on the lower jigs such that the lower jigs were 32.5 mm apart from each other relative to the center of the electrolyte sheet. The upper jigs were placed 65 mm apart from each other relative to the center of the electrolyte sheet. The upper jigs were lowered from above onto the electrolyte sheet at a rate of 5 mm/min to measure the strength of the electrolyte sheet. Tables 1 and 2 show the results. The evaluation criteria were as follows.

Acceptable: the strength was 160 MPa or more.

Unacceptable: the strength was less than 160 MPa.

Tables 1 and 2 show the ratio of the width of the outer peripheral area of the unsintered plate body to the shortest distance between the outer edge and the center of the unsintered plate body as "Outer peripheral area width ratio".

TABLE 1

|  |  | Example 1 | Example 2 | Example 3 | Example 4 | Example 5 |
|---|---|---|---|---|---|---|
| Condition | Outer peripheral area width ratio (%) | 40 | 10 | 20 | 30 | 20 |
|  | Resin layer  Thickness on central area (μm) | 10 | 10 | 10 | 10 | 10 |
|  | Thickness on outer peripheral area (μm) | 30 | 40 | 30 | 30 | 20 |
|  | Temperature in sintering unsintered body (° C.) | 1400 | 1200 | 1600 | 1400 | 1400 |
| Evaluation | Ceramic grain median size $D_{50}$  Maximum median size (μm) | 2.0 | 1.3 | 4.0 | 2.0 | 2.2 |
|  | Minimum median size (μm) | 2.0 | 1.0 | 3.7 | 1.9 | 2.0 |
|  | Maximum median size/ minimum median size | 1.00 | 1.30 | 1.08 | 1.05 | 1.10 |
|  | Ceramic plate body density  Maximum density/ minimum density | 1.10 | 1.10 | 1.10 | 1.00 | 1.30 |
|  | Warpage height | Acceptable | Acceptable | Acceptable | Acceptable | Acceptable |
|  | Burr height | Acceptable | Acceptable | Acceptable | Acceptable | Acceptable |
|  | Strength | Acceptable | Acceptable | Acceptable | Acceptable | Acceptable |

TABLE 2

|  |  | Comparative Example 1 | Comparative Example 2 | Comparative Example 3 | Comparative Example 4 | Comparative Example 5 |
|---|---|---|---|---|---|---|
| Condition | Outer peripheral area width ratio (%) | 20 | 20 | 50 | 5 | 0 |
|  | Resin layer  Thickness on central area (μm) | 10 | 10 | 10 | 10 | 10 |
|  | Thickness on outer peripheral area (μm) | 15 | 50 | 50 | 30 |  |
|  | Temperature in sintering unsintered body (° C.) | 1200 | 1600 | 1600 | 1400 | 1400 |
| Evaluation | Ceramic grain median size $D_{50}$  Maximum median size (μm) | 1.1 | 4.1 | 4.4 | 2.3 | 3.0 |
|  | Minimum median size (μm) | 0.9 | 3.7 | 2.4 | 1.7 | 0.8 |
|  | Maximum median size/ minimum median size | 1.22 | 1.11 | 1.83 | 1.35 | 3.75 |
|  | Ceramic plate body density  Maximum density/ minimum density | 1.10 | 1.10 | 1.40 | 1.40 | 1.51 |
|  | Warpage height | Acceptable | Unacceptable | Unacceptable | Acceptable | Unacceptable |
|  | Burr height | Unacceptable | Acceptable | Unacceptable | Unacceptable | Unacceptable |
|  | Strength | Acceptable | Acceptable | Unacceptable | Unacceptable | Unacceptable |

As shown in Table 1, in the electrolyte sheets of Examples 1 to 5, the ceramic grains had a median size $D_{50}$ of 1.0 μm to 4.0 μm, and the maximum median size $D_{50}$ of the ceramic grains was 1.0 to 1.3 times the minimum median size $D_{50}$ of the ceramic grains. In the electrolyte sheets of Examples 1 to 5, the maximum density of the ceramic plate body was 1.0 to 1.3 times the minimum density of the ceramic plate body. Thus, the electrolyte sheets of Examples 1 to 5 had high strength and less or no warpage and less or no burrs.

As shown in Table 2, in the electrolyte sheets of Comparative Examples 1 to 5, at least one of warpage or burrs was not reduced. Also, the electrolyte sheets of Comparative Examples 3 to 5 had low strength.

REFERENCE SIGNS LIST 1g ceramic green sheet
1s unsintered plate body
1t ceramic green tape
2b resin powder
2e resin layer
10, 130 electrolyte sheet for solid oxide fuel cells (electrolyte sheet)
10g unsintered body
10p ceramic plate body
10r recess
100 unit cell for solid oxide fuel cells (unit cell)
110 fuel electrode
120 air electrode
Ce center of unsintered plate body
E outer edge of unsintered plate body
$P_1$, $P_2$, $P_3$, $P_4$, $P_5$, $P_6$, $P_7$, $P_8$, $P_9$ electrolyte sheet pieces
$Q_1$, $Q_2$, $Q_3$, $Q_4$, $Q_5$, $Q_6$, $Q_7$, $Q_8$, $Q_9$ centers of electrolyte sheet pieces
$R_1$ central area of unsintered plate body
$R_2$ outer peripheral area of unsintered plate body
$T_1$ thickness of resin layer on central area
$T_2$ thickness of resin layer on outer peripheral area
$W_1$ shortest distance between outer edge and center of unsintered plate body
$W_2$ width of outer peripheral area of unsintered plate body
X casting directions
Y directions perpendicular to casting directions

The invention claimed is:

1. An electrolyte sheet for solid oxide fuel cells, the electrolyte sheet comprising:
a ceramic plate body containing a cubic zirconia sintered material,
wherein, with the ceramic plate body being defined to have nine portions including an outer peripheral portion and a central portion, the nine portions each being a square of equal size, the outer peripheral portion consisting of eight portions located on a periphery of the ceramic plate body, the central portion consisting of one portion surrounded by the outer peripheral portion, ceramic grains in each of the nine portions have a median size D50 of 1.0 μm to 4.0 μm, and a maximum median size D50 of the ceramic grains among the nine portions is 1.0 to 1.3 times a minimum median size D50 of the ceramic grains among the nine portions, the median size D50 of the ceramic grains being defined as a particle size at 50% in a cumulative particle size distribution curve of the ceramic grains expressed as a cumulative percentage against particle size scale.

2. The electrolyte sheet for solid oxide fuel cells according to claim 1, wherein a maximum density of the ceramic plate body among the nine portions is 1.0 to 1.3 times a minimum density of the ceramic plate body among the nine portions.

3. The electrolyte sheet for solid oxide fuel cells according to claim 1, wherein the cubic zirconia sintered material is a scandia-stabilized cubic zirconia sintered material.

4. The electrolyte sheet for solid oxide fuel cells according to claim 1, wherein at least one of a first main surface and a second main surface of the ceramic plate body includes a plurality of scattered recesses.

5. A unit cell for solid oxide fuel cells, the unit cell comprising:
  a fuel electrode;
  an air electrode; and
  the electrolyte sheet for solid oxide fuel cells according to claim 1 between the fuel electrode and the air electrode.

* * * * *